United States Patent
Foldvik et al.

(10) Patent No.: US 7,814,206 B1
(45) Date of Patent: Oct. 12, 2010

(54) FORECASTING TOOL FOR COMMUNICATIONS NETWORK PLATFORMS

(75) Inventors: Randolph G. Foldvik, Kirdland, WA (US); Sylvester Freeman, Jr., Atlanta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 227 days.

(21) Appl. No.: 12/016,474

(22) Filed: Jan. 18, 2008

Related U.S. Application Data (60) Provisional application No. 60/977,947, filed on Oct. 5, 2007.

(51) Int. Cl.
*G06F 15/173* (2006.01)

(52) U.S. Cl. ...................... 709/226; 709/223

(58) Field of Classification Search ............. 709/223, 709/224, 225, 226
See application file for complete search history.

(56) References Cited

U.S. PATENT DOCUMENTS

| | | | | |
|---|---|---|---|---|
| 6,738,736 B1* | 5/2004 | Bond | ............................ | 703/2 |
| 2002/0152305 A1* | 10/2002 | Jackson et al. | ............... | 709/224 |
| 2003/0002489 A1 | 1/2003 | Bulick et al. | | |
| 2004/0181794 A1* | 9/2004 | Coleman et al. | ............ | 718/104 |
| 2006/0233101 A1 | 10/2006 | Luft et al. | | |
| 2007/0094381 A1 | 4/2007 | Weiss et al. | | |

OTHER PUBLICATIONS

Nonfinal Office Action dated Feb. 2, 2009 and cited in U.S. Appl. No. 11/554,422.

* cited by examiner

*Primary Examiner*—Lashonda T Jacobs
*Assistant Examiner*—Marshall McLeod
(74) *Attorney, Agent, or Firm*—Parks IP Law LLC; Mickki D. Murray, Esq.

(57) ABSTRACT

A forecasting tool for planning a communications network having one or more platforms is disclosed. The forecasting tool is configured to obtain, associate, track, and correspond, capacity and demand across numerous platforms. Growth curves can be determined and associated with various platforms and platform locations. Anticipated growth events, and their corresponding growth curves, can be associated with any number of platforms. Various growth curves can be combined according to any scales, factors, or parameters, to create custom growth curves for any location or platform. Reconfigurations can be included in any analysis. The forecast tool analyzes each platform and can recommend reconfiguration if network platforms utilizations exceed any engineering limits or other thresholds.

23 Claims, 4 Drawing Sheets

FORECASTING TOOL FOR COMMUNICATIONS NETWORK PLATFORMS

RELATED APPLICATION

This application claims priority to U.S. Provisional Patent Application Ser. No. 60/977,947 filed on Oct. 5, 2007, the entirety of which is hereby incorporated by reference.

TECHNICAL FIELD

The present disclosure relates generally to planning, and planning tools for, communications networks. More particularly, the present disclosure relates to a forecasting tool for communications network platforms.

BACKGROUND

With the increasingly wide use of data and messaging networks for transmitting data has come an increased demand on communications networks and network platforms. Similarly, the inclusion of an increasing number of data and messaging applications on communications devices has further increased demand on communications networks. For example, the proliferation of wireless data transfer has been accompanied by a corresponding increase in wireless network requirements.

Wireless communications networks typically consist of hundreds of interconnected platforms. Maintaining network resource availability for the ever-increasing resource demand is a complex task. Aside from the difficulty in identifying and tracking a current network configuration for a complex network, planning for future network configurations can be an extremely complex task. The enormous amount of data that must be collected, analyzed, and considered, for example, current and future resource loads, pending network configuration changes, reconfigurations required to support growing subscriber loads, upgrades in resource capabilities, and the like, makes future network planning difficult.

Traditionally, network planning has been performed through manual manipulation of network data by network personnel. The capacity of this type of planning is often limited to a portion of the network. Furthermore, different personnel may perform analysis of various portions of the network according to varied methods, resulting in an increased likelihood of error and a decreased likelihood of "big-picture" planning. Compounding these difficulties is the fact that marketing and/or product-driven changes may not be properly taken into account during any network utilization analysis since such data is rarely, if ever, in the hands of the personnel performing such analysis.

SUMMARY

The various embodiments of the present disclosure provide systems and methods for forecasting and planning communications networks.

A forecasting tool for planning a communications network including one or more platforms is disclosed. The forecasting tool can be configured to obtain, associate, track, and correspond, resource capacity and demand across numerous platforms. Growth curves can be determined and associated with various platforms and platform locations. Anticipated growth events, and their corresponding growth curves, can be associated with any number of platforms. Various growth curves can be combined according to any scales, factors, or parameters, to create custom growth curves for any location or platform. Reconfigurations can be included in any analysis. The forecast tool analyzes each platform and can recommend reconfiguration if network platforms utilizations exceed any engineering limits or other thresholds.

The data used by the forecasting tool can include any number of categories of data. These categories, sometimes referred to herein as "tables," can provide the forecasting tool with the ability to recognize capacity at any time for any given platform and/or platform location. Future network reconfigurations can be taken into account to project capacity beyond a present or past date. Anticipated growth, including natural growth, and externally-caused growth can be taken into account by using data sets, growth curves, growth rates, factors, parameters, or the like, to apply to the current platform resource demand to determine anticipated further demand for a network platform resource. One or more such data sets can be applied to any current or past demand data to forecast future demand for a network platform resource. Verification, error checking, corrective action, and notification steps can be performed by the forecasting tool prior to, during, or after analysis. As data is created, analyzed, and/or output by the forecasting tool, the forecasting tool can export the data, save the data, or pass the data or data sets to other entities for further analysis or other uses.

Accordingly, an embodiment of the present disclosure includes a method for forecasting network platform resource requirements. The method includes the steps of obtaining historical resource utilization data associated with at least one network platform resource, determining at least one projected growth rate based upon the historical resource utilization data of the at least one network platform resource, obtaining pending network reconfiguration data for at least one network platform resource, obtaining data relating to anticipated externally-caused growth of demand for at least one network platform resource, forecasting future platform resource utilization of at least one network platform resource by determining the projected growth of resource demand for the at least one network platform based upon the at least one associated growth rate, the pending network reconfiguration data, and the externally caused growth data; and recommending a network reconfiguration based upon the forecasted network platform resource utilization.

According to an aspect of the disclosure, the step of recommending a network reconfiguration comprises changing an effective date of a network platform resource, wherein the effective date is the date from which a network platform resource is available to satisfy network platform resource demand.

According to another aspect of the disclosure, the pending network reconfiguration data comprises the addition of new network platform resources.

According to another aspect of the disclosure, the data relating to anticipated externally-caused growth of demand for a network platform resource comprises at least one growth curve.

According to another aspect of the disclosure, the forecasting step further comprises determining the projected growth of resource demand for the at least one network platform based upon the two or more associated growth rates, the pending network reconfiguration data, and at least one growth rate associated with the externally-caused growth data.

According to another aspect of the disclosure, the external cause comprises at least one marketing campaign.

According to another aspect of the disclosure, the external cause comprises at least one new product.

According to another aspect of the disclosure, the external cause comprises at least one new data application.

Another embodiment of the present disclosure includes a system for forecasting network platform resource requirements. The system includes at least one input/output (I/O) device configured to obtain input data associated with at least one network platform resource. The input data includes current and forecasted platform resource capacity data, at least one growth curve derived from historical platform resource usage data, and at least one growth curve derived from anticipated externally-caused growth data. The system further includes a processor, in communication with the at least one I/O device. The processor is configured to determine present and future capacity of the at least one network platform resource based upon at least a portion of the input data. The processor is also configured to determine present and future demand for the at least one network platform resource based upon at least a portion of the input data, and to recommend a network reconfiguration based upon the forecasted network platform resource capacity and the forecasted network platform resource demand. The system also includes a memory, in communication with the processor. The memory is configured to store the input data.

According to an aspect of the disclosure, the input data further comprises at least two growth curves derived from historical platform resource usage data.

According to another aspect of the disclosure, the system further comprises a graphical user interface configured to enable a user to change input data.

According to another aspect of the disclosure, the anticipated externally-caused growth data comprises a growth curve.

According to another aspect of the disclosure, the processor is further configured to complete the determining and recommending steps more than one time.

According to another aspect of the disclosure, the external cause comprises at least one marketing campaign.

According to another aspect of the disclosure, the external cause comprises at least one new product.

According to another aspect of the disclosure, the external cause comprises at least one new product feature.

According to another aspect of the disclosure, the processor repeats the determining and recommending steps if the user changes the input data after the processor has begun execution of any of the determining or recommending steps.

Another embodiment of the present disclosure includes a computer-readable medium. The computer-readable medium includes computer-executable instructions that, when executed, perform the steps of obtaining historical resource utilization data associated with at least one network platform resource, determining at least one projected growth rate based upon the historical resource utilization data of the at least one network platform resource, obtaining pending network reconfiguration data for at least one network platform resource, obtaining data relating to anticipated externally-caused growth of demand for at least one network platform resource, forecasting future platform resource utilization of at least one network platform resource by determining the projected growth of resource demand for the at least one network platform based upon the at least one associated growth rate, the pending network reconfiguration data, and the externally caused growth data, and recommending a network reconfiguration based upon the forecasted network platform resource utilization.

These and further features of the present disclosure will be described in detail below with reference to drawings.

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
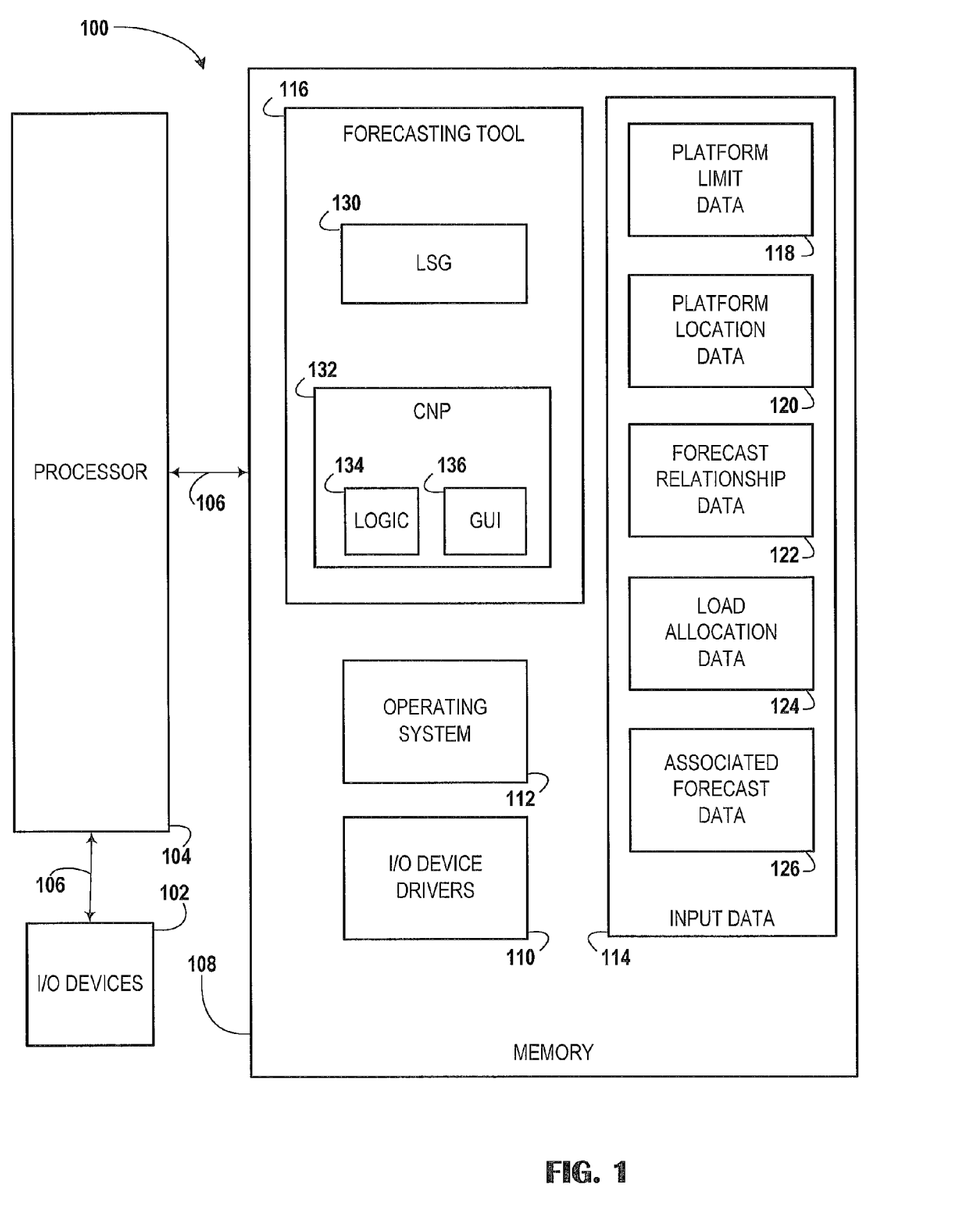
FIG. 1 schematically illustrates an exemplary data system according to an embodiment of the present disclosure.

Referring now to the drawings in which like numerals represent like elements throughout the several views, FIG. 1 illustrates an exemplary data processing system 100. The illustrated data processing system 100 includes input/output (I/O) devices 102 that are operatively linked and in communication with a processor 104 via a data/memory bus 106. The I/O devices 102 can include, but are not limited to, a display, a printer, a plotter, a keyboard, a pointing device, or other I/O devices or tools. The processor 104 is operatively linked and in communication with a memory 108 via a data/memory bus 106.

The memory 108 collectively refers to all memory types associated with the data processing system 100 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 108 is illustrated as residing proximate the processor 104, it should be understood that the memory 108 can be a remotely accessed storage system, for example, a server on the Internet. Moreover, the memory 108 is intended to encompass network memory and/or other storage devices in wired or wireless communication with the data processing system 100, which may utilize one or more I/O devices 102 to facilitate such communication. Thus, any of the data and software described below can be stored within memory 108 and/or accessed via network connections to other data processing systems (not shown) that may comprise a local area network (LAN), a metropolitan area network (MAN), or a wide area network (WAN), for example. Accordingly, the present disclosure may operate on the data processing system 100, wherein the data processing system 100 is configured as a server to one or more client data processing systems as dictated by a client/server model.

The illustrated memory 108 includes I/O device drivers 110 to facilitate communication between the I/O devices 102 and the other components of the data processing system 100.

The illustrated memory 108 also includes an operating system 112, input data 114, and a forecasting tool 116.

The operating system 112 can be any known operating system. The input data 114 can include a number of categories of input data, namely, platform limit data 118, platform location data 120, forecast relationship data 122, load allocation data 124, and associated forecast data 126. In general, the forecasting tool 116 receives the input data and uses the data to recommend a reconfiguration of a messaging and/or data network. The input data categories are later described in detail.

Forecasting Tool Components

The illustrated forecasting tool 116 includes a load set generator component 130 ("LSG") and a core network planning component 132 ("CNP"). The LSG 130 is configured to perform various verification processes to, for example, confirm the presence of each input, identify potential logical inconsistencies with the data, and flag any errors or anomalies present in the inputs. Moreover, the LSG 130 is configured to parse resource data reports and aggregate all the input into a corresponding loadset. The loadset is provided to the CNP component 132 to load or create a project. The CNP component 132 includes algorithms 134 that can perform operations on the loadset for recommending a reconfiguration of the messaging and/or data network for forecasting future network variables and a graphical user interface 136 ("GUI"). It should be understood that the functions of the LSG 130, the CNP 132, and the GUI 136 components need not be performed by separate entities. As such, the LSG 130, the CNP 132, and the GUI 136 components can be combined into any number of entities.

The GUI 136 can allow a user to load a project based upon a set of input tables. Input data 114 can be provided to the CNP 132 in a loadset. The input data 114 can be viewed by a user, and the user can be given the ability to modify the input data 114, for example, during analysis of various network configurations. The GUI 136 can provide access to algorithms 134. The user can run the algorithms 134 to obtain results of analysis of the network. The GUI 136 can allow a user to view the network configuration at past, present, or future dates or time periods. The GUI 136 can also handle exporting and/or displaying outputs from the forecasting tool 116, for example, exporting results to an external file, to a screen for display, or to another tool.

In a basic configuration, the GUI 136 can consist of a graphical interface for generating charts, graphs, and/or spreadsheets based upon the data used by and/or generated by the forecasting tool 116. For example, the GUI 136 can chart present utilization values on a graph with projected growth based upon any number of considerations. The generated graphs can be used for further analysis.

Forecasting Tool Inputs

The data processing system 100 can include a set of input data 114 ("data"). The data 114 can be entered in any usable form, for example, the data 114 can be stored in tables, databases, arrays, text files, or any other format, for use by the forecasting tool 116, or any portion thereof. It should be understood that the data need not be stored in table form. However, for the sake of simplicity, and since the description is made conceptually clearer, the following disclosure will refer to various data sets as "tables." It should also be understood that the names assigned to these data sets are exemplary only, and are assigned solely for the purposes of clarifying and simplifying the description. The data can be stored in any desired form or manner, and the files can be given any names.

The Platform Limit Table

The platform limit table 118 can provide the basic name of each platform, along with a unit of measurement and a platform capacity. The unit of measurement denotes how platform capacity is measured, and the platform capacity denotes the actual capacity, in the unit of measurement, for a particular platform. For example, if the network platform is an MMSC, the platform type can be listed as "MMSC" to identify the platform type. The platform model name can be listed, if desired, to further identify the platform. Continuing the example of an MMSC, the platform model can be listed as, for example, a "Nokia MMSC 60," or any other model number, according to any identification processes used by the network operator or the hardware manufacturer. The units used to measure the platform capacity can be listed in this table. In the case of an exemplary MMSC, the unit of measurement for capacity is often messages per second. In an exemplary platform limit table 118, therefore, the notation "messages per second," or any other desired notation can be included to indicate the capacity measurement unit to the user. The platform capacity can then be listed in the identified units. In the case of the Nokia MMSC 60, this limit can be noted as "60 messages per second."

Other data can be included in the platform limit table 118. For example, the operating temperature and/or humidity range of the platform, the countries in which the platform complies with legal requirements and/or frequencies, the cost of the platform, platform operating costs, or any other specifications, according to the network operators' needs. It may be preferable to limit the data stored in the platform limit table 118 to operating characteristics, limits, or specifications of platforms.

The Platform Location Table

The platform location table 120 can provide the location of platforms, the number of platforms at any given location, and the effective date as of which the platform(s) have been operational. The location can be listed in any desired format. For example, the location can be a country, a region, a state, a city, an address, a ZIP code, coordinates, other location information, combinations thereof, or the like. The number of platforms at a given location need not be directly set forth, rather each platform at a given location can have an entry in the platform location table. As such, the total number of platforms at a particular location is easily ascertainable. The effective date as of which a platform has been, or will be, operational can also be in any format. Other information can be included in the PLT 120, for example, the date upon which the platform will cease to be operational, the platform type, the platform model number, platform identification information, the platform MAC identification number, and/or any other data, according to the network operators' needs.

For example, if an operator has two MMSC platforms at LocationX, the platform location table 120 can include two MMSC entries denoting LocationX as the Location. The platform location table 120 can also include model numbers, the effective dates, the end dates, if desired, the platform model names, and the location. As such, the platform location table 120, in conjunction with the platform limits table 118 can provide the data processing system 100 with the ability to determine total MMSC capacity at any location. In the above example, the total MMSC capacity of LocationX can be calculated from the inputs provided by the Platform Limit Table 118 and the Platform Location Table 120. To further clarify this concept, in this example, if both MMSCs at LocationX are Nokia MMSC 60s, each with a capacity of 60 messages per second, the total capacity for MMS messages at LocationX will be around 120 messages per second.

The Forecast Relationship Table

The forecast relationship table 122 can define the relationship between equipment, i.e., platform, locations, and forecasts. As such, the forecast relationship table 122 can provide the data processing system 100 with the ability to derive unique growth curves associated with each location represented in the platform location table 120. An exemplary forecast relationship table 122 can include entries for location, and can provide an indication as to which growth curve, or combination of curves, should be used to forecast growth at the specified location.

In addition to associating a determined growth curve with a given platform location, the forecast relationship table 122 provides the ability to associate multiple forecasts with each platform location. If multiple forecasts are indicated, a blended growth curve can be derived to represent any desired combination of the combined growth curves.

Determining which growth curves, rates, or characteristics are associated with each location can be determined in any number of ways. For example, if historical data for LocationZ provides all of the anticipated growth for LocationZ, then the forecast relationship table 122 can indicate that the LocationZ growth curve should be associated with LocationZ. If, however, there are unforeseen growth events expected, as will be explained in more detail below, then the forecast relationship table 122 can indicate the same or a different growth curve, or a combination of growth curves for LocationZ forecasting purposes.

As yet another example, consider the scenario in which a new platform is deployed at LocationX. In such a scenario, historical usage and/or growth data may be unavailable. In traditional forecasting analysis, a lack of historical data can make planning future growth at LocationX little more than applying a "best guess," or some similar approach. The forecasting tool 116 of the present disclosure, however, allows complex calculations to be made to create growth data for such a location, or for anticipated growth events. Taking this example further, assuming that analysis reveals that LocationX and LocationY are similar in categories relevant to network planning. In such a scenario, the forecast relationship table 122 can indicate that LocationY growth curves, rates, or characteristics, should be associated with LocationX. The forecast relationship table 122 can take any number of factors into account to create a tailored growth curve based on one or more growth curves to provide the user with an accurate method for planning LocationX platform requirements.

The Load Allocation Table

The load allocation tables 124 can provide the data processing system 100 with measured observation values for particular platforms. These values can be real observation data taken from the actual platforms, if desired. Alternatively, the observation data can be generated. In addition to providing the observation values, the load allocation tables 124 can provide information relating to possible future redistribution of traffic between two or more locations. A load allocation table 124 can be developed for each type of platform, if desired.

An exemplary load allocation table 124 can include a desired number of platform locations and the actual observed values for each location according to a desired time frame, e.g., by hour, day, week, month, year, or the like. The values can be measured in any format, including integers and percentages, according to the needs of the network operator.

The Associated Forecast Tables

The associated forecast tables 126 can include the actual growth curves discussed above. A growth curve can include a series of numerical values or percentage values over a period of time. As is known, the differences between points in such a series will provide an analyst with growth curves or growth rates. A growth curve, or a combination of two or more growth curves, can be associated with one or more platforms, and can be applied during analysis of the platform(s) to determine projected utilization growth of the analyzed platform(s).

The ability to apply specific growth curves, or a combination thereof, can give the user the ability to take into account data that is often out of the hands of the network analyst. For example, an applied growth curve can take into account a new marketing program that is forecast to increase utilization of a specific network service by, for example, 10%. In such an example, the 10% growth represented by this marketing program is not natural growth, as would be provided by historical data. As such, the exemplary 10% growth may not be included in any analysis without the application of a specific growth curve that represents that 10% growth, alone, or in combination with other growth curves or rates. Since a combination of growth curves can be used, a great deal of non-natural growth can be reflected in the network analysis by simply including extra growth curves.

By way of another example, if a new device is planned for launch, and the new device has some new data application, then a growth curve that represents anticipated growth associated with the new device or the new data application may be helpful in network planning analysis. Typically, network analysts use historical data to determine a projected growth rate. As explained above, this historical-data-based methodology will generally fail to take unnatural growth such as marketing campaigns, new devices, and new applications, into consideration.

The Load Set Generator

The forecasting tool 116 can include a load set generator 130 ("LSG"). The LSG 130 can be a section of code or logic and can perform several tasks. For example, the LSG 130 can confirm the presence of each input, identify potential logical inconsistencies with the data, and flag any errors or anomalies present in the inputs. Moreover, the LSG 130 can parse the input data and aggregate all the input into a corresponding loadset.

In an effort to ensure that the forecasting tool 116 produces reliable results, the forecasting tool 116 can perform various checks on the input data prior to generating a loadset for analysis by the forecasting tool 116. Some exemplary checks are described below. Some or all of these checks can be performed by the LSG 130. Although the following input data checks will be described with respect to the LSG 130, it should be understood that any portion(s) of the forecasting tool 116 can perform these data checks. It should also be understood that some or all of the following general types of checks can be performed on any or all of the input data tables, either alone, or in combination with other checks.

The LSG 130 can be configured to confirm that the table provided for analysis by the forecasting tool 116 is complete and correct, i.e., that all table data and data positions are present. If one or more values, categories, headings, or the like, are not present, then the LSG 130 can issue a descriptive error message and terminate processing. Alternatively, rules can be applied to determine if processing should continue, perhaps with an adjustment, qualifier, error message, or other modification to the analysis.

The LSG 130 can also confirm that values entered in the tables are valid. The LSG 130 can apply any number of rules, for example, in one embodiment, a valid value indicates a number that is greater than zero and less than 100. If an out-of-range value is found, the LSG 130 can issue a descriptive error message and terminate processing. Alternatively, as explained above, the LSG 130 can apply various rules to determine if analysis should continue, and if any modifications or adjustments should be made prior to, during, or after analysis.

The LSG 130 can also perform cross-checks between tables to confirm consistency among data entries. For example, the LSG 130 can confirm that the forecast relationship table 122 references one or more forecast curves that are available. If a referenced forecast growth curve is missing, the LSG 130 can cease or modify processing. Similarly, if any discrepancy is found during cross-checks, a descriptive error message can be generated and the LSG 130 can terminate processing. Alternatively, as explained above, analysis can continue according to various rules.

The LSG 130 can also confirm that dates specified in the tables are proper. For example, the LSG 130 can check the start dates and end dates in the platform location table 120 to ensure that the start date is before the end date. In other tables, dates can be verified as present or missing, the order of dates can be verified, rules can be applied, or any other operations can be performed to ensure accuracy. As another example, the LSG 130 can confirm that any dates in a table that are intended to be future dates are actually in the future. If a discrepancy is found, a descriptive fatal error message can be generated and the LSG 130 can terminate processing. Alternatively, as explained above, analysis can continue according to various rules.

The LSG 130 can confirm that all specified names, locations, or model numbers in the various tables actually exist. If not, a descriptive error message can be generated and the LSG can terminate processing. Alternatively, as explained above, analysis can continue according to various rules.

The various tables can contain city and/or state codes associated with physical locations. The LSG 130 can confirm that the specified state codes are valid and/or defined in other tables. If not, a descriptive error message can be generated and the LSG 130 can terminate processing. Alternatively, as explained above, analysis can continue according to various rules.

The LSG 130 can also confirm that any platform limits, measured actuals, utilization percentages, or the like, pass a "reality check." In other words, known values can be checked against entered data to give added protection against data entry errors. For example, if the messages per second limit listed for an SMSC exceeds the known maximums for that particular unit, the LSG 130 can cease or modify analysis, as explained above. Similarly, if the observed values include irregularities, the LSG 130 can cease or modify analysis, or notify the operator of the discrepancy. Similar checks can be performed on any data in the tables.

Whether or not all of these checks, or additional checks not described above, are performed by the LSG 130, the LSG 130 is configured to parse the data input and load the input into a corresponding loadset. After the loadset is generated, the loadset can be provided to, or made accessible to, the core network planning module 132 ("CNP"). Alternatively, a loadset can be exported from the forecasting tool, printed, or stored for other purposes, e.g., backup, charting, record-keeping, or any other purpose.

The Core Network Planning Tool

The forecasting tool 116 can include a core network planning module 132 ("CNP"). The loadset generated by the LSG 130 can be provided to the CNP 132 to load or create a project. The CNP 132 can include applications 134 for recommending a reconfiguration of the network, and a graphical user interface ("GUI") 136. The functions of the applications 134 and the GUI 136 can be combined, if desired. The applications 134 can be algorithms, functions, dynamic analysis modules, or any other means for analyzing the generated loadset. For ease of description, the applications 134 will be referred to as "algorithms."

A loadset can be passed to, or accessed by, the CNP 132 to create or load a project based upon the loadset. The CNP logic 134, for example, algorithms or other processing logic, can be executed, and the results can be presented to a user or passed to other modules for further analysis or for other purposes. In some embodiments, the user may export the results to another device such as a printer, another data processing system, a memory, or another software program. Some of the functions of the CNP 132 are described in more detail below.

Forecasting Network Capacity Requirements

Figure 2:
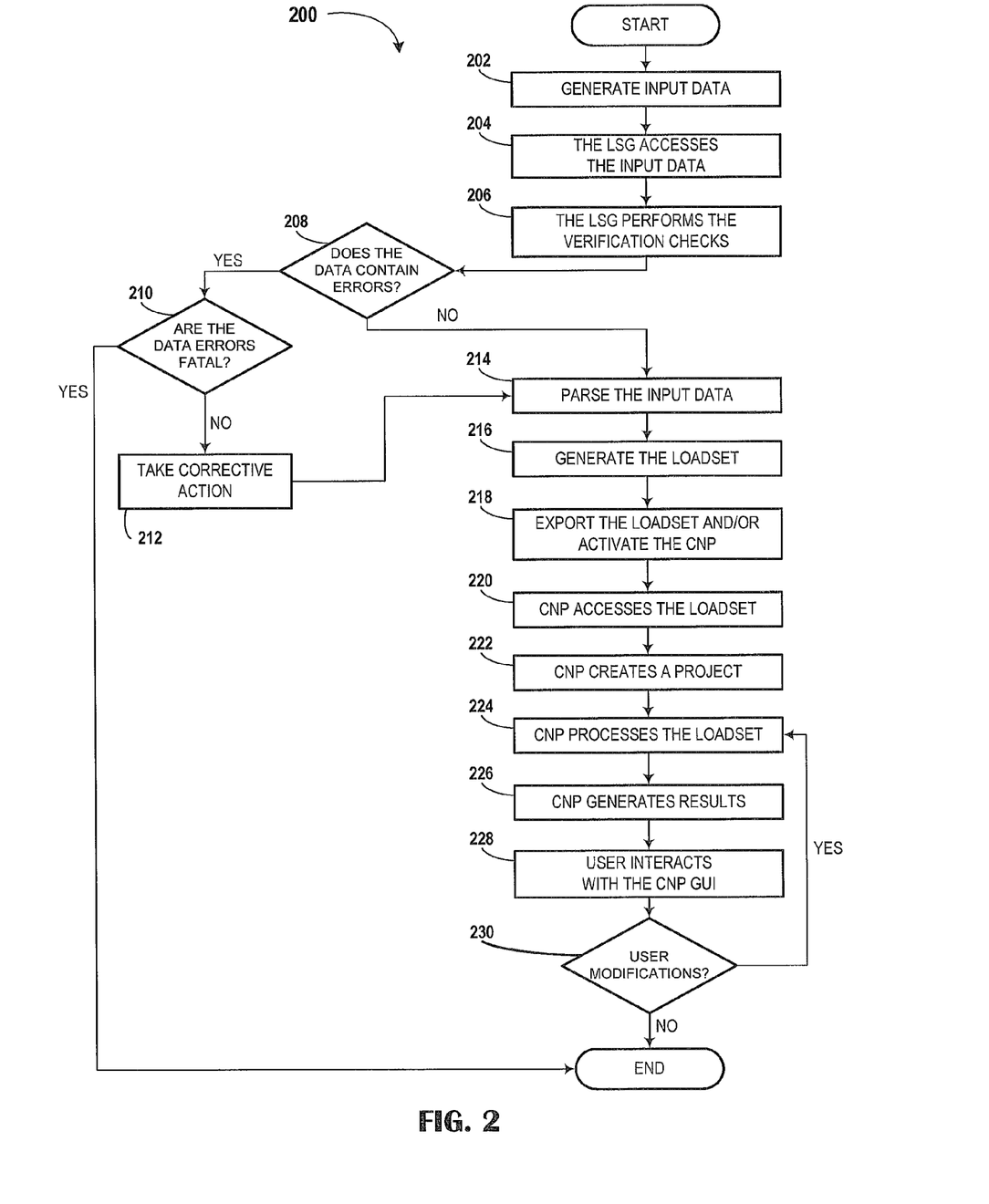
FIG. 2 schematically illustrates an exemplary method according to an embodiment of the present disclosure.

Referring now to FIG. 2, a flow diagram of an exemplary method 200 is depicted, according to the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on one or more computer readable media.

The method 200 begins at step 202 wherein the input data 114 can be generated. The input data 114 can be generated automatically by the data processing system 100 or by another system and transferred to the data processing system 100. The input data 114 can also be manually generated. If desired, the input data 114 can be stored in table format. The illustrated embodiment includes input data 114 that will be described herein as a set of input data or input data tables.

The method 200 can continue with step 204 wherein the input data 114 can be transferred to the forecasting tool 116 and loaded into the LSG 130. At step 206, the LSG 130 can perform various verification processes to, for example, confirm the presence of each required input, identify potential logical inconsistencies with the data, and flag any errors or anomalies present in the inputs, as explained above. As shown at step 208, the LSG 130 can determine if the input data 114 contains errors. If not, then the method 200 can proceed. If there are errors, then, as shown in step 210, the LSG 130 can apply rules to determine if the errors are fatal, or if corrective action is available. If errors are fatal, then the method 200 can end. If the errors are not fatal, then the method 200 can proceed to step 212.

At step 212, the LSG 130 can take corrective action to correct any errors in the input data 114. Corrective action can include correcting known errors, implementing new capacities or units of measurement, correcting typographical errors, importing new information, other action, combinations thereof, or the like. Alternatively, the LSG 130 can determine that an appropriate corrective action is the issuance of an error message, or taking no corrective action. Regardless of the action taken, or not taken, at step 212, the method 200 can proceed to step 214. The LSG 130 can terminate analysis at any time if any fatal errors are recognized in the input data 114. Similarly, error messages can be generated and data can be modified or supplemented as necessary at any time during analysis, though the termination or corrective action steps are illustrated here.

At step 214, the LSG 130 can parse the input data 114. This step helps ensure that the input data 114 is standardized and put into a usable and/or proper format prior to attempting to generate a loadset. At step 216, the LSG 130 generates a loadset.

After the loadset is generated, the forecasting tool 116 can export the loadset, store the loadset, or pass the loadset to the CNP 132 for processing. The method 200 is illustrated and described according to the third option, namely, that the CNP 132 accesses and then analyzes the loadset. As such, the CNP 132 can be activated, as shown in step 218. The CNP 132 accesses or receives the loadset, at step 220, and creates a project based upon this loadset, at step 222. This occurs, for example, when a user selects an option on the GUI 136 to create a new project. Alternatively, these and other steps can be automated and can therefore occur without user input.

As shown in step 224, the CNP 132 can process the loadset. The processing steps can include execution of algorithms 134. The algorithms 134 can run any number of processes using the data loaded in the loadset.

At step 226, the results can be exported. For example, the results can be presented to a user. In some embodiments, the results can be exported to another device such as a printer, another data processing system, a memory, a database, or another software program.

At step 228, the user can interact with the GUI 136. At step 230, the decision is made as to whether the user modified any of the input data 114 during step 228. If the user modified any of the input data 114, then the forecasting tool 116 can return the process to step 224 whereat the forecasting tool can reprocess the input data 114. If the user did not modify the input data 114 at step 228, then the method 200 can end.

Figure 3:
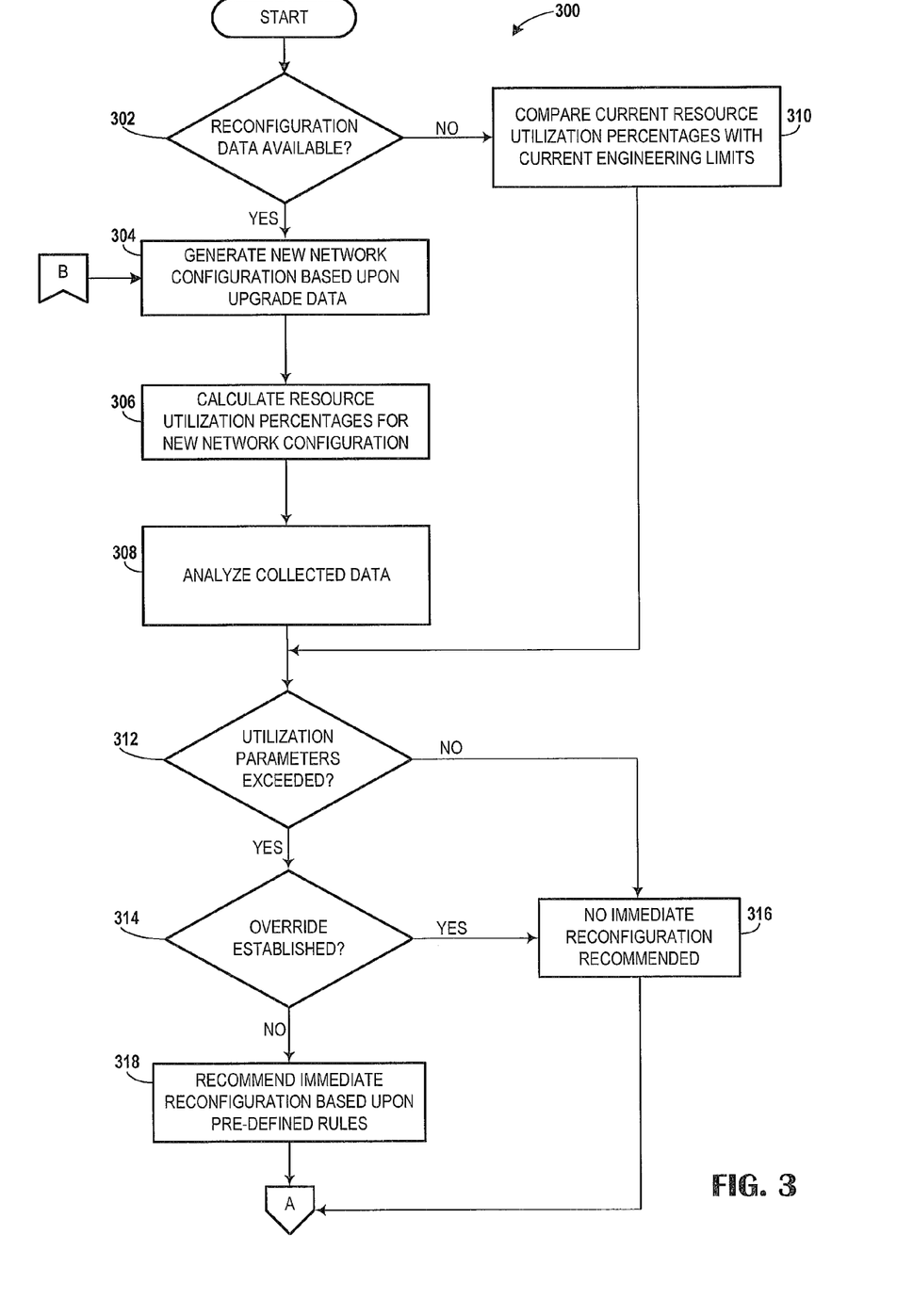
FIGS. 3 and 4 schematically illustrate an exemplary method of forecasting network resource needs according to an embodiment of the present disclosure.

Referring now to FIG. 3, an exemplary flow diagram of a method 300 for planning and forecasting network requirements in accordance with various aspects of the present disclosure is provided. The method 300 begins at step 302, wherein a decision is made as to whether reconfiguration data is available.

Reconfiguration data is provided via analysis of the input data 114. It is contemplated that analysis of the input data 114 can be performed when a project is created or loaded, or when any of the input data 114 has been updated. If reconfiguration data is available, then the method 300 can proceed to step 304 at which a new network configuration can be generated based upon the reconfiguration data. It should be understood that the reconfiguration data can include effective dates that occur during some point of the forecast time frame. As such, the forecasting tool 116 is configured to adjust the forecast results, taking into account these future growth events.

The method 300 can proceed to step 306, wherein network utilization, network limits, platform limits, or the like, can be calculated for the projected network configuration. The calculated data can be analyzed, at step 308.

If reconfiguration data is not available at step 302, the method 300 can proceed to step 310, wherein the current link utilization percentages are compared with the current utilization parameters.

After either step 308 or step 310, the method 300 can proceed to step 312, wherein a decision is made as to whether the engineering limits are exceeded for any platform in the analyzed network configuration. If one or more engineering limits are exceeded, the method 300 can proceed to step 314, wherein a check is performed to determine if an override is established for any of the engineering limits. If one or more overrides are established, or if no engineering limits are exceeded in the previous step, the method 300 can proceed to step 316 wherein the forecasting tool 116 determines that no immediate reconfiguration is required and thus no recommendation is made.

If no override is established, the method 300 can proceed to step 318 whereat the forecasting tool 116 recommends an immediate reconfiguration based upon a number of rules, for example, rules for the allocation of A, B, C, and D platforms. Such recommended reconfigurations can include reallocation or installation of platforms. For example, if the results indicate that the engineering limits for platform A have been, or will soon be, exceeded at location X, the forecasting tool 116 can analyze other platforms on the network that are able to perform some or all of the tasks performed by platform A. If, for example, platform B is not operating near the engineering limits of platform B, then the forecasting tool 116 can suggest, or even implement, allocation of platform B resources to perform some or all tasks assigned to platform A.

Figure 4:
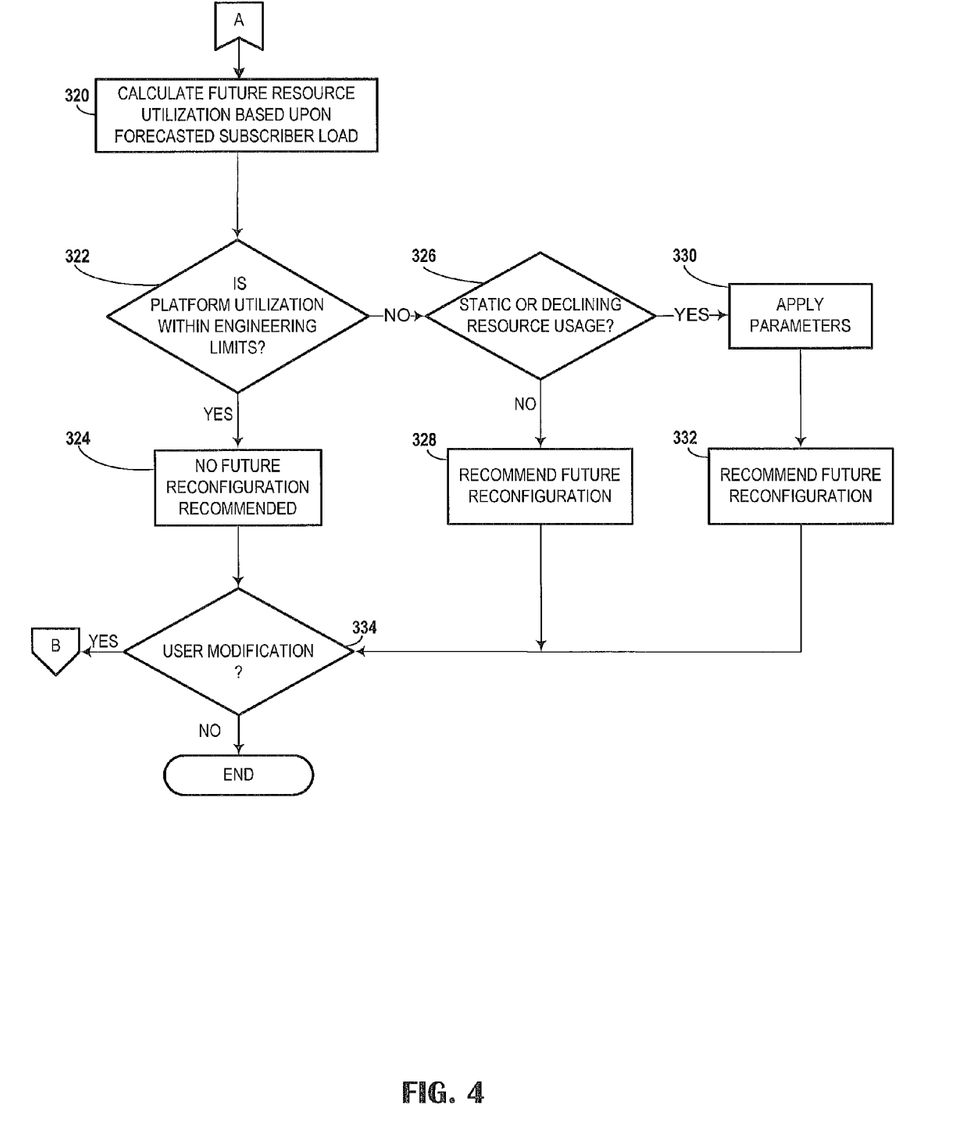

Referring now to FIG. 4, the method 300 proceeds to step 320 wherein future platform utilizations are calculated based upon forecasted subscriber load and forecasted growth. The forecasted growth can include both natural growth and growth due to external factors. The forecasted growth data, either natural, or externally-caused, can be obtained from the associated forecast tables 126. As mentioned above, the associated forecast tables 126 can include various growth curves. These growth curves can include growth curves depicting natural growth and/or growth curves depicting growth due to external factors, such as mass marketing campaigns, cost cuts, new features or new product introduction, changes in competitors' rates, or the like. Various factors, adjustments, or the like can be included in the input data 114 to adjust or modify data points as needed. These data are helpful in forecasting an accurate depiction of network platform requirements for a future time frame. If these data are not included in the analysis of projected growth, the output results from the forecasting tool 116 can have doubtful accuracy and reliability, especially in the event that an external event causes a large fluctuation in platform resource demand.

The method 300 can proceed to step 322, wherein a decision is made as to whether the future platform utilization is within the projected engineering limits. If the future platform utilization is within the current or projected engineering limits for that platform, the method 300 can proceed to step 324, and no immediate reconfiguration will be recommended by the forecasting tool 116.

If, on the other hand, the future platform utilization is not within the platform engineering limits at any time, then the method 300 can proceed to step 326. At step 326 the forecasting tool 116 can determine whether the forecasted platform utilization is increasing, static, or decreasing. If the forecasted platform utilization is increasing, then the forecasting tool 116 can recommend a reconfiguration of the network based upon a number of rules, as explained above, and as illustrated at step 328. These recommended reconfigurations can include, for example, reallocation of platform resources, installation of new platforms, making changes to effective dates of platforms, or the like. These recommendations can be exported, displayed to the user, or even implemented, partially, or completely, by the forecasting tool 116.

If, at step 326, there is no positive growth in platform resource utilization, i.e., the forecasted platform resource utilization is static or declining, the method 300 can proceed to step 330 and future platform utilizations can be calculated based upon various parameters for analyzing static or decreasing platform resource utilization, if desired. The method 300 can proceed to step 332 and the forecasting tool 116 can recommend a future reconfiguration of the network. For example, the forecasting tool 116 can recommend the decommissioning of a platform, changes in the start, or effective, date of a platform, reallocation of resources from other platforms, combinations thereof, or the like. The method 300 can then proceed to step 334.

At step 334, a check is performed to determine if a user modified any of the input data 114. If any of the input data 114 has been modified, then the method 300 can return to step 304 of FIG. 3 and a new network configuration can be generated based upon the user modification. If there have been no user modifications to the input data 114, then the method 300 can end.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for generating a network reconfiguration by forecasting network platform utilization, the method comprising:

an input/output (I/O) device obtaining historical utilization data associated with a network platform;

a computer processor, in executing computer-readable instructions stored on a computer-readable media, determining a projected natural change in demand based upon the historical utilization data of the network platform;

the I/O device obtaining pending network reconfiguration data associated with the network platform;

the I/O device obtaining data relating to anticipated externally-caused change in demand for the network platform;

the computer processor, in executing the computer-readable instructions, forecasting future utilization of the network platform based upon the projected natural change in demand, the pending network reconfiguration data, and the externally-caused change in demand;

the computer processor, in executing the computer-readable instructions, generating the recommended network reconfiguration based upon the forecasted network platform utilization, including identifying an effective date of a network platform resource, wherein the effective date is the date from which the network platform resource will be available to satisfy the forecasted network platform utilization;

the computer processor, in executing the computer-readable instructions, repeating the step of determining the projected natural change in demand, the forecasting step, and the generating step if a user changes the input data after the processor has begun any of the step of determining the projected natural change in demand, the forecasting step, and the generating step;

the computer processor, in executing the computer-readable instructions, determining whether utilization parameters for the network platform are exceeded;

the computer processor, in executing the computer-readable instructions, determining whether a reconfiguration override is present; and the computer processor, in executing the computer-readable instructions, recommending the generated network reconfiguration if utilization parameters for the network platform are exceeded and the reconfiguration override is not present.

2. The method of claim 1, wherein the pending network reconfiguration data comprises data associated with the addition of a new network platform resource.

3. The method of claim 1, wherein the data relating to the anticipated externally-caused change in demand for the network platform comprises at least one growth curve.

4. The method of claim 1, wherein the computer processor, in executing the computer-readable instructions, forecasting the future utilization of the network platform based upon the projected natural change in demand, the pending network reconfiguration data, and the externally-caused change in demand comprises the computer processor forecasting future utilization of the network platform based upon a growth rate associated with the natural change in demand, the pending network reconfiguration data, and a growth rate associated with the externally-caused change in demand.

5. The method of claim 1, wherein the obtained externally-caused change in demand relates to a marketing campaign.

6. The method of claim 1, wherein the obtained externally-caused change in demand relates to a new product.

7. The method of claim 1, wherein the obtained externally-caused change in demand relates to a new data application.

8. A system for generating a recommended network reconfiguration by forecasting network platform utilization, the system comprising:

an input/output (I/O) device configured to obtain input data associated with a network platform, the input data comprising:

historical utilization data associated with a network platform;

pending network reconfiguration data associated with the network platform; and data relating to anticipated externally-caused change in demand for the network platform;

a processor, in communication with the I/O device, configured to:

determine a projected natural change in demand based upon the historical utilization data of the network platform;

forecast future utilization of the network platform based upon the projected natural change in demand, the pending network reconfiguration data, and the externally-caused change in demand;

generate the recommended network reconfiguration based upon the forecasted network platform utilization, wherein the processor, in being configured to generate the recommended network reconfiguration, identifies an effective date of a network platform resource, wherein the effective date is the date from which the network platform resource will be available to satisfy the forecasted network platform utilization;

repeat the step of determining the projected natural change, the forecasting step, and the generating step if a user changes the input data after the processor has begun any of the step of determining projected natural change step, the forecasting step, and the generating step;

determine whether utilization parameters for the network platform are exceeded;

determine whether a reconfiguration override is present; and if utilization parameters for the network platform are exceeded and the reconfiguration override is not present, recommend the formed network reconfiguration; and a memory, in communication with the processor, the memory configured to store the input data.

9. The system of claim 8, wherein the historical utilization data of the input data comprises a growth curve derived from historical utilization of the network platform.

10. The system of claim 8, wherein the system further comprises a graphical user interface configured to enable a user to change the input data.

11. The system of claim 8, wherein the data relating to the anticipated externally-caused change in demand comprises a growth curve.

12. The system of claim 8, wherein the processor is further configured to complete the step of determining the projected natural change, the forecasting step, and the generating step more than one time.

13. The system of claim 8, wherein the externally-caused change in demand relates to a marketing campaign.

14. The system of claim 8, wherein the externally-caused change in demand relates to a new product.

15. The system of claim 8, wherein the externally-caused change in demand relates to a new product feature.

16. A computer-readable medium comprising computer-executable instructions that, when executed by a processor, perform the steps of:

obtaining historical utilization data associated with a network platform;

determining a projected natural change in demand based upon the historical utilization data of the network platform;

obtaining pending network reconfiguration data associated with the network platform;

obtaining data relating to anticipated externally-caused change in demand for the network platform;

forecasting future utilization of the network platform based upon the projected natural change in demand, the pending network reconfiguration data, and the externally-caused change in demand; and generating a recommended network reconfiguration based upon the forecasted network platform utilization, including identifying an effective date of a network platform resource, wherein the effective date is the date from which the network platform resource will be available to satisfy the forecasted network platform utilization;

repeating the step of determining the projected natural change in demand, the forecasting step, and the generating step if a user changes the input data after the processor has begun any of the step of determining the projected natural change in demand, the forecasting step, and the generating step;

determining whether utilization parameters for the network platform are exceeded;

determining whether a reconfiguration override is present; and if utilization parameters for the network platform are exceeded and the reconfiguration override is not present, recommending the generated network reconfiguration.

17. The system of claim 8, wherein the pending network reconfiguration data comprises data associated with a new network platform resource.

18. The computer-readable medium of claim 16, wherein the pending network reconfiguration data comprises data associated with addition of a new platform resource.

19. The computer-readable medium of claim 16, wherein the data relating to the anticipated externally-caused change in demand for the network platform comprises at least one growth curve.

20. The computer-readable medium of claim 16, wherein forecasting the future utilization of the network platform based upon the projected natural change in demand, the pending network reconfiguration data, and the externally-caused change in demand comprises forecasting future utilization of the network platform based upon a growth rate associated with the natural change in demand, the pending network reconfiguration data, and a growth rate associated with the externally-caused change in demand.

21. The computer-readable medium of claim 16, wherein the obtained externally-caused change in demand relates to a marketing campaign.

22. The computer-readable medium of claim 16, wherein the obtained externally-caused change in demand relates to a new product.

23. The computer-readable medium of claim 16, wherein the obtained externally-caused change in demand relates to a new data application.

* * * * *